(12) United States Patent
Badri et al.

(10) Patent No.: US 12,254,073 B2
(45) Date of Patent: Mar. 18, 2025

(54) METHOD AND SYSTEM FOR OFFLINE AUTHENTICATION

(71) Applicant: Konica Minolta Business Solutions U.S.A., Inc., Ramsey, NJ (US)

(72) Inventors: Subramanyam Badri, Livermore, CA (US); Randy Cruz Soriano, San Leandro, CA (US)

(73) Assignee: Konica Minolta Business Solutions U.S.A., Inc., Ramsey, NJ (US)

( * ) Notice: Subject to any disclaimer, the term of this patent is extended or adjusted under 35 U.S.C. 154(b) by 246 days.

(21) Appl. No.: 17/854,249

(22) Filed: Jun. 30, 2022

(65) Prior Publication Data

US 2024/0004981 A1   Jan. 4, 2024

(51) Int. Cl.
*G06F 21/33* (2013.01)
*G06F 21/00* (2013.01)
*G06F 21/10* (2013.01)
*G06F 21/44* (2013.01)

(52) U.S. Cl.
CPC .............. *G06F 21/33* (2013.01); *G06F 21/00* (2013.01); *G06F 21/1014* (2023.08); *G06F 21/44* (2013.01)

(58) Field of Classification Search
CPC ...... G06F 21/33; G06F 21/00; G06F 21/1014; G06F 21/44
See application file for complete search history.

(56) References Cited

U.S. PATENT DOCUMENTS

| | | | | |
|---|---|---|---|---|
| 11,647,023 | B2* | 5/2023 | Avetisov | H04W 12/06 726/6 |
| 2020/0104478 | A1* | 4/2020 | Chauhan | G06F 16/27 |
| 2021/0152547 | A1* | 5/2021 | Barhudarian | H04L 67/143 |
| 2023/0020656 | A1* | 1/2023 | Momchilov | H04L 63/10 |
| 2023/0315830 | A1* | 10/2023 | Mittal | H04L 63/0846 726/21 |

OTHER PUBLICATIONS

"Storing a Token for Offline Authentication"—Vick et al, Stack Overflow, Sep. 2017 https://stackoverflow.com/questions/46114017/storing-a-token-for-offline-authentication (Year: 2017).*
OAuth Authentication for Offline Application using .NET SDK—Dropbox, Dropbox Forum, Mar. 2020 https://www.dropboxforum.com/discussions/101000042/oauth-authentication-for-offline-application-using-net-sdk/543870 (Year: 2020).*

* cited by examiner

*Primary Examiner* — Randy A Scott
(74) *Attorney, Agent, or Firm* — Buchanan Ingersoll & Rooney PC (57) ABSTRACT

A method, a system, and a non-transitory computer readable program code are disclosed for offline authentication of users for access to web applications. The method includes requesting, by a processor, access for a user to one or more relying party applications; receiving, by the processor, a redirection request from the one or more relying party applications to retrieve an authentication token for the user from an identity service provider; determining, by the processor, that the identity service provider is not available to provide the authentication token for the user; retrieving, by the processor, the authentication token for the user from a trusted source; forwarding, by the processor, the authentication token for the user retrieved from the trusted source to the one or more relying parties; and receiving, on the processor, authentication from the one or more relying parties for the user to access the one or relying party applications.

20 Claims, 6 Drawing Sheets

METHOD AND SYSTEM FOR OFFLINE AUTHENTICATION

FIELD

The present disclosure relates to a method and system for offline authentication of users for access to web applications.

BACKGROUND

Single sign-on (SSO) is an authentication process that allows a user to access multiple applications with one set of login credentials. Single sign-on, for example, is a common procedure in enterprises, where a client accesses multiple resources connected to a local area network (LAN).

Single sign-on (SSO) can be performed using an identity provider (IdP or IDP), which can be a system entity that creates, maintains, and manages identity information for principals and provides authentication services to relying applications within a federation or distributed network. Identity providers (IdP) offer user authentication as a service. Relying party applications, such as web applications, outsource the user authentication step to a trusted identity provider. Such a relying party application is said to be federated, that is, it consumes federated identity.

An identity provider can be, for example, a trusted provider that allows a system to use single sign-on (SSO) to access other websites. In addition, single sign-on (SSO) can enhance usability, for example, by reducing the number of passwords that a user needs to recall to access a plurality of web applications. In addition, an identity provider (IdP) can provide security and can also facilitate connections between cloud computing resources and users that can decrease the need for users to re-authenticate when using mobile and roaming applications. However, if the identity provider (IdP) is not available for any reason, the user may not be able to access a web application and corresponding resources, which may not only be inconvenient, it can also cause losses, for example, monetary losses.

SUMMARY

Accordingly, it would be desirable to have a method and system for offline authentication of users for web applications when an identity provider (IdP), for example, is not available.

In accordance with an embodiment, a method is disclosed for offline authentication of users for access to web applications, the method comprising: requesting, by a processor, access for a user to one or more relying party applications; receiving, by the processor, a redirection request from the one or more relying party applications to retrieve an authentication token for the user from an identity service provider; determining, by the processor, that the identity service provider is not available to provide the authentication token for the user; retrieving, by the processor, the authentication token for the user from a trusted source; forwarding, by the processor, the authentication token for the user retrieved from the trusted source to the one or more relying parties; and receiving, on the processor, authentication from the one or more relying parties for the user to access the one or relying party applications.

In accordance with an embodiment, a computer program product is disclosed for offline authentication of users for access to web applications, the computer program product comprising: a non-transitory computer-readable storage medium having program instructions embodied therewith, the program instructions executable by a computer to cause the computer to perform a method, comprising: requesting, by a processor, access for a user to one or more relying party applications; receiving, by the processor, a redirection request from the one or more relying party applications to retrieve an authentication token for the user from an identity service provider; determining, by the processor, that the identity service provider is not available to provide the authentication token for the user; retrieving, by the processor, the authentication token for the user from a trusted source; forwarding, by the processor, the authentication token for the user retrieved from the trusted source to the one or more relying parties; and receiving, on the processor, authentication from the one or more relying parties for the user to access the one or relying party applications.

In accordance with an embodiment, a system is disclosed for offline authentication of users for access to web applications, the system comprising: a processor configured to: request access for a user to one or more relying party applications; receive a redirection request from the one or more relying party applications to retrieve an authentication token for the user from an identity service provider; determine that the identity service provider is not available to provide the authentication token for the user; retrieve the authentication token for the user from a trusted source; forward the authentication token for the user retrieved from the trusted source to the one or more relying parties; and receive authentication from the one or more relying parties for the user to access the one or relying party applications.

It is to be understood that both the foregoing general description and the following detailed description are exemplary and explanatory and are intended to provide further explanation of the invention as claimed.

DESCRIPTION OF THE PREFERRED EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 1:
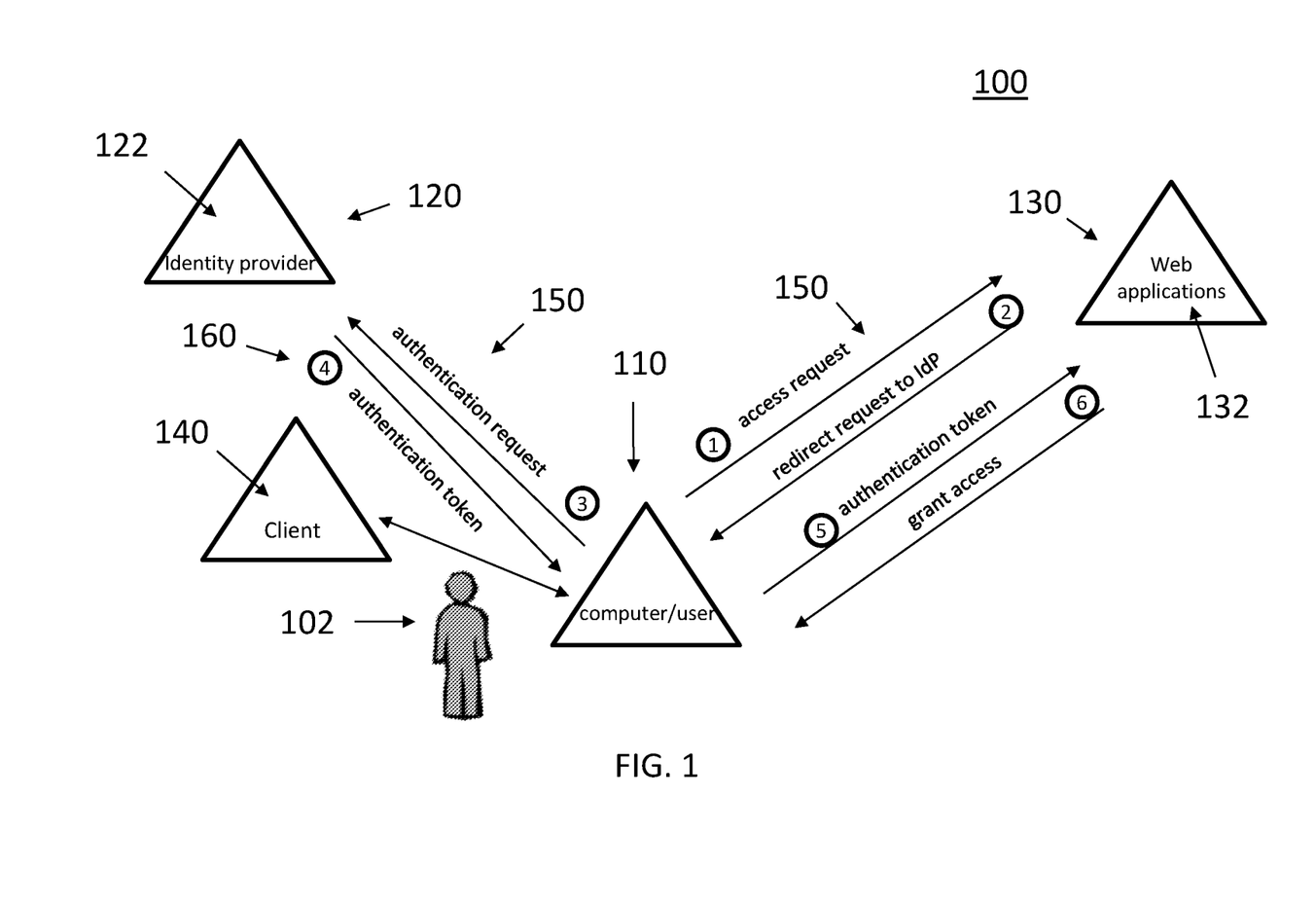
FIG. 1 is an illustration of a system for online authentication of a user in accordance with known systems.

FIG. 1 is an illustration of a system 100 for online authentication of a user 102 in accordance with a known system. The system 100 can include, for example, one or more computer systems 110, 120, 130, 140. The one or more computer systems 110, 120, 130, 140 can be, for example, a personal computer, a home or office security system within a home or office, a server, a smart phone, a smart tablet, a camera, a router, a medical device or apparatus, a MFP (or printer), that can generate print data usable in a printer, a print server, or multi-function peripheral (MFP), and the like.

In accordance with an embodiment, at least one of the one or more computer systems 110, 120, 130, 140 can include at least one authentication application (or authentication module) for receiving an authenticator and/or biometric identifier, which can authenticate the user 102. In accordance with an embodiment, the authenticator, can be, for example, one or more of a password or passcode and biometric identifiers. In accordance with an exemplary embodiment, biometric identifiers can include distinctive, measurable characteristics used to label and describe or identify an individual, including a metric related to human characteristics. For example, biometric identifiers can include physiological characteristics of an individual including but not limited fingerprints, palm veins, face recognition, DNA (or deoxyribonucleic acid), palm print, hand geometry, iris recognition, retina, and/or odor/scent.

In accordance with an exemplary embodiment, once the user 102 has been authenticated, the user 102 may have access to the one or more of the computer systems 110, 120, 130, 140 as disclosed herein. The at least one authentication application can be configured to receive the authenticator(s) and/or biometric identifier(s), for example, via a keypad for a username and password ("password"), and/or a sensor, scanning device, or an electronic reader, which can read and/or obtain data from, for example, a proximity cards, a radio-frequency identification (RFID) card, smart cards, wearable devices, RSA tokens, and/or biometric identifiers. In accordance with an exemplary embodiment, the one or more computer systems 110, 120, 130, 140 can be accessed by the user 102 via at least one authenticator and/or a biometric identifier, and preferably, at least two or more authenticators and/or biometric identifiers.

In accordance with an exemplary embodiment, the one or more computer systems 110, 120, 130, 140 can include a processor or central processing unit (CPU), and one or more memories for storing software programs and data. The processor or CPU carries out the instructions of a computer program, which operates and/or controls at least a portion of the functionality of the devices the one or more computer systems 110, 120, 130, 140. The one or more computer systems 110, 120, 130, 140 can also include an operating system (OS), which manages the computer hardware and provides common services for efficient execution of various software programs. For example, the software programs can include application software, for example, for managing an authentication module and/or biometric identifier, and/or printer driver software, for example, for one or more of the computer systems 110, 120, 130, 140, for example, the computer systems 110, 140.

In accordance with an exemplary embodiment, the computer system 110 can be a multi-function peripheral (MFP) or printer, which can be connected to the computer systems 120, 130, 140 via a communications network 150. In accordance with an exemplary embodiment, the multi-function peripheral (MFP) can include at least a copy function, an image reading function, a facsimile (fax) function, and a printer function, and forms an image on a sheet based on a print job (print instruction) received, for example, from the computer system 140.

In accordance with another exemplary embodiment, for example, the computer system 110 can be a medical device or a medical apparatus, which can be used, for example, for diagnostic and/or therapeutic purposes. Examples of medical devices or medical apparatuses can include medical imaging devices, which can obtain, for example, radiological, angiographic, sonographic, and/or tomographic images. Alternatively, the one or more computer systems 110, 120, 130, for example, the computer system 130 can be, for example, a back-end database, or enterprise database system, which can be accessed by the one or more users indirectly through an external application, for example, through the one or more computer systems 110, 120, 140.

In accordance with an exemplary embodiment, one or more of the one or more computer systems 110, 140 can be incorporated into a home or office security system, which can include a method or system, which authenticates a user 102 for accessing the home or office, for example, via a door to the building, a floor or room of the home or office, via, for example, an elevator, and/or any other secured room. In addition, the method and systems as disclosed herein can be used in securing device, for example, security systems, and computers, within the user's home or office.

In accordance with an embodiment, the one or more computer systems 110, 120, 130, 140 are connected via a communication network 150. The communication network 150 may include, for example, a conventional type network, wired or wireless, and may have any number of configurations, such as a star configuration, token ring configuration, or other known configurations. The communication network 150 may include one or more local area networks ("LANs"), wide area networks ("WANs") (e.g., the Internet), virtual private networks ("VPNs"), peer-to-peer networks, near-field networks (e.g., Bluetooth®), cellular networks (for example, 3G, 4G, 5G, other generations), and/or any other interconnected data path across which multiple computing nodes may communicate.

In accordance with an exemplary embodiment, data may be transmitted in encrypted or unencrypted form between the one or more computer systems 110, 120, 130, 140, 210 (FIG. 2) using a variety of different communication protocols including, for example, various Internet layer, transport layer, or application layer protocols. For example, data may be transmitted between the one or more computer systems 110, 120, 130, 140, 210 via the network 150 using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), file transfer protocol (FTP), WebSocket (WS), wireless access protocol (WAP), various messaging protocols (SMS, MMS, XMS, IMAP, SMTP, POP, WebDAV, etc.), or other known protocols.

As shown in FIG. 1, the system 100 can be used for online authentication of a user 102 in accordance with known methods for access to one or more relying party applications 132, for example, one or more web applications hosted on the computer system 130. The one or more relying party applications 132 can include, for example, web applications, such as Google Workspace (previously G Suite), and/or provided by Salesforce, Microsoft365, and Box.

As shown in FIG. 1, the user 102 can be authenticated, for example, using a single sign-on (SSO) authentication scheme. Once, the user 102 has been authenticated by the computer system 110, in a first step (1), the computer system 110 can request access to one or more reply party applications 132, for example, one or more web applications, hosted on the computer system 130. The computer system 130 receives the request and in step 2 redirects the request back to the computer system 110 to authenticate the user or digital identity of the user 102 via an identity provider 122 being hosted on computer system 120. The computer system 110 receives the redirected request and will forward the authentication request to the identity provider (IdP) 122, for example, hosted by the computer system 120. As shown in FIG. 1, the computer system 120 can be an identity provider (IdP) 122 configured to store and manage digital identities of one or more users 102. In step 4, the identity provider (IdP) 122 can check the user's 102 identity via the authenticator, for example, via username-password combinations and other factors including biometric factors. In addition, the identity provider (IdP) 122 can authenticate any entity connected to a network or a system, for example, the computer system 110, 140. In particular, the identity provider (IdP) 122 can be used in a cloud computing environment to manage user identities. In accordance with an embodiment, if the user 102, or alternatively, the user 102 and the computer system 110 has been authenticated by the identity provider (IdP) 122, the computer system 120 associated with the identity provider (IdP) 122 can send an authentication token (for example, which can include a user identity and authentication cookie) in step 4 to the computer system 110 for the user 102 and/or the user 102 and the computer system 110. In step 5, the computer system 110 can sends the authentication token to the computer system 130 hosting the web application(s) 132, and in step 6, the computer system 110 associated with the user 102 can receive access to one or more of the relying party application 132 being hosted on the computer system 130.

Figure 2:
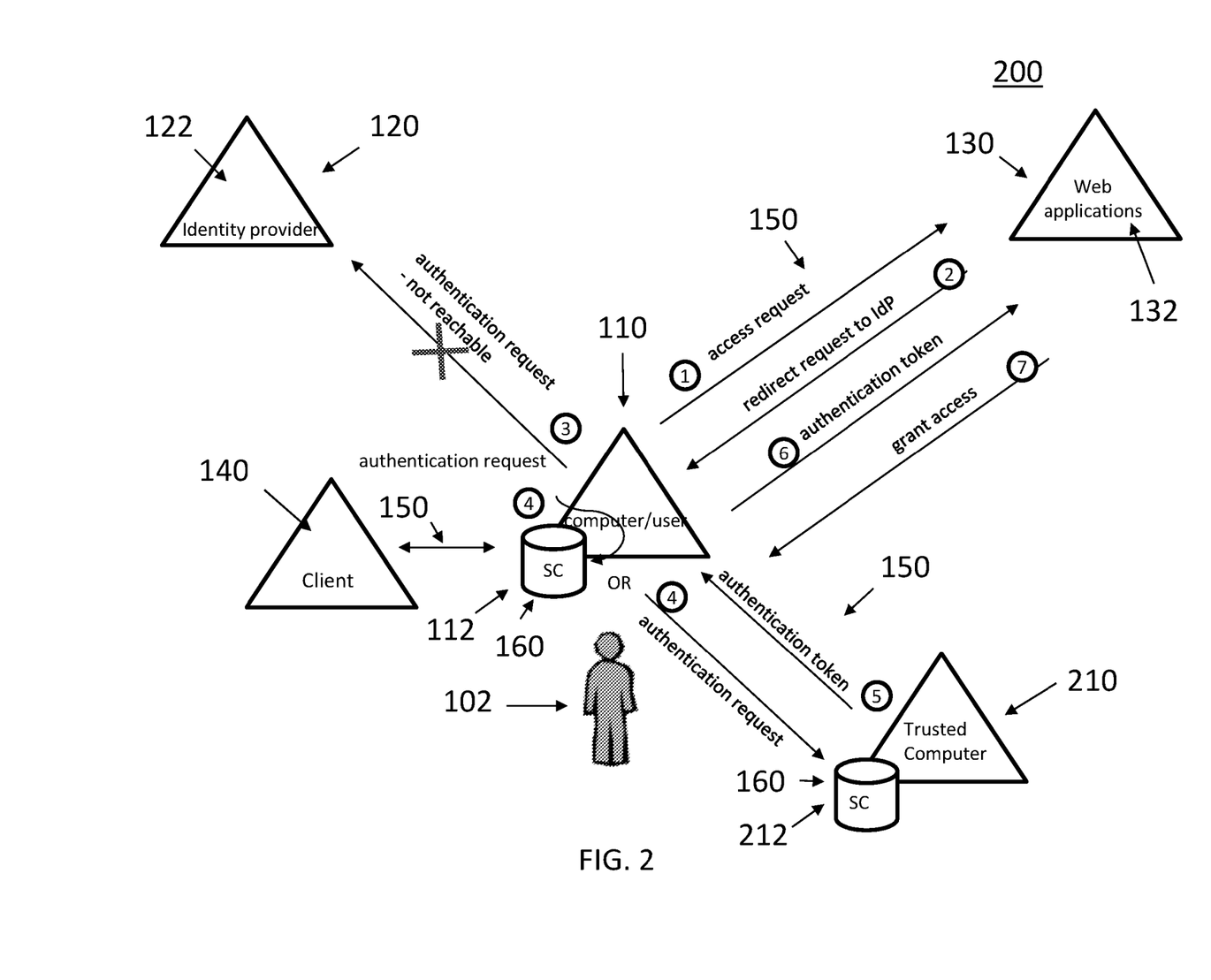
FIG. 2 is an illustration of a system for offline authentication of a user in accordance with an exemplary embodiment.

FIG. 2 is an illustration of a system 200 for offline authentication of a user 102 in accordance with an exemplary embodiment. As set forth above, when the user 102 accesses the one or more relying party application 132 hosted on the computer system 130, the authentication token is generated by the identity provider (IdP) 122, for example, hosted on computer system 120. However, the identity provider (IdP) 122 may not be reachable, such that the authentication token cannot be generated by the identity provider (IdP) 122, and thus access to the one or more relying party applications 132 hosted on computer system 130 will not be available to the user 102 and corresponding computer system 110, 140. As shown in FIG. 2, in accordance with an embodiment, when the user identification and authentication cookies are cached into a web browser of the computing device 110, 140 of the user 102, the user 102 can be identified without redirecting the authentication request to the identity provider (IdP) 122. However, the caching of the user identification and authentication cookies is only good as long as the cache is not cleared on the computer system 110, 140 of the user 102. Accordingly, it would be desirable to have a method and system for offline authentication of a user 102 when the identity provider (IdP) 122 is not available.

The system 200 can include, for example, one or more computer systems 110, 120, 130, 140, 210. The one or more computer systems 110, 120, 130, 140, 210 can be, for example, a personal computer, a home or office security system within a home or office, a server, a smart phone, a smart tablet, a camera, a router, a medical device or apparatus, a MFP (or printer), that can generate print data usable in a printer, a print server, or multi-function peripheral (MFP), and the like. In accordance with an embodiment, at least one of the one or more computer systems 110, 120, 130, 140, 210 can include at least one authentication application (or authentication module) for receiving an authenticator and/or biometric identifier, which can authenticate the user 102.

In addition, one or more of the computer systems 110, 210 can include a secure container 112, 212. The secure container 112, 212 being, for example, an executable software package or application that is isolated from other software packages or applications running on the one or more computer systems 110, 210. The secure container 112, 212, being configured for containerization (or sandboxing) of the authentication token, i.e., user identification and authentication cookie(s). The secure container 112, 212, can be a trusted platform module (TPM), for example, which can be a secure cryptoprocessor or dedicated microcontroller designed to secure hardware through integrated cryptographic keys. In accordance with an embodiment, the trusted platform module (TPM) can be a computer chip conforming to the standard. For example, Windows 11 includes a trusted platform module 2.0 (TPM 2.0) that is design, for example to help increase security against firmware and ransomware attacks The system 200 can be configured such that an authentication token 160 can be secured in a secure container 112, 212, in the computer system 110 of the user 102, or alternatively, in a secure container 212 of another trusted computer system 210. In accordance with an embodiment, the authentication token 160 can be retrieved from the secure container 112, 212, in the computer system 110 of the user 102, or alternatively, in the secure container 212 of the trusted computer system 210 in accordance, for example, with one or more protocols for access to the one or more relying party applications 132 hosted on the computer system 130. In addition, in accordance with an embodiment, the authentication token 160 can be sent continuously as a time based authentication token, which can be renewed and replaced as an additional security measure. In addition, the authentication token 160 can include limitations on one or more types of computer systems in which the authentication token 160 can be used. For example, the authentication token 160 may not be used with a mobile device as the computer system 110.

As shown in FIG. 2, the user 102 can be authenticated, for example, using a single sign-on (SSO) method on a computer system 110, 140. For example, the user 102 may be authenticated via the computer system 140, which can be, for example, a mobile device, that provide access to computer system 110. Once, the user 102 has been authenticated by the computer system 110, in a first step (1), the computer system 110 can request access to one or more relying party applications 132 hosted on the computer system 130. The computer system 130 receives the request and in step 2 redirects the request back to the computer system 110 to authenticate the user or digital identity of the user 102 via an identity provider 122 being hosted on computer system 102. The computer system 110 receives the redirected request and will forward the authentication request to the identity provider (IdP) 122, for example, hosted by the computer system 120. However, the identity provider (IdP) 122 hosted on computer system 120 may not be available to the computer system 110. For example, the computer system 120 of the identity provider (IdP) may be experiencing a loss of power, a software or hardware update or problem, one or more routing malfunctions, or an IP address for the computer system 120 that hosts the identity provider (IdP) 122 may simply not be reachable for any reason. For example, the IP address for the identity provider (IdP) 122 may have changed and the corresponding computer system 110 has not been updated or made aware of the change in IP address of the computer system 120 hosting the identity provider (IdP) 122.

In accordance with an embodiment, once the computer system 120 has determined that the identity provider (IdP) 122 and/or the computer system 120 hosting the identity provider (IdP) 122 is not available, the computer system 110 can retrieve a store authentication token 160 having the user's identity and authentication cookies for one or more of the relying party applications 132 hosted on computer system 130. In accordance with an embodiment, the stored authentication token 160 can be retrieved, for example, from the secure container 112 in the computer system 110 of the user 102, or alternatively, as in step 5, from the secure container 212 in the trusted computer system 210. Once the computer system 110 of the user 102 has retrieved the authentication token from the secure container 112, 212, in step 6, the computer system 110 can sends the authentication token to the computer system 130 hosting the one or more web applications 132, and in step 7, the computer system 110 associated with the user 102 can receive access to one or more of the web applications 132 being hosted on the computer system 130. In accordance with an embodiment, the computer system 130 is a cloud computing arrangement in which the one more web applications 132 can be distributed over one or more cloud computers.

Figure 3A:
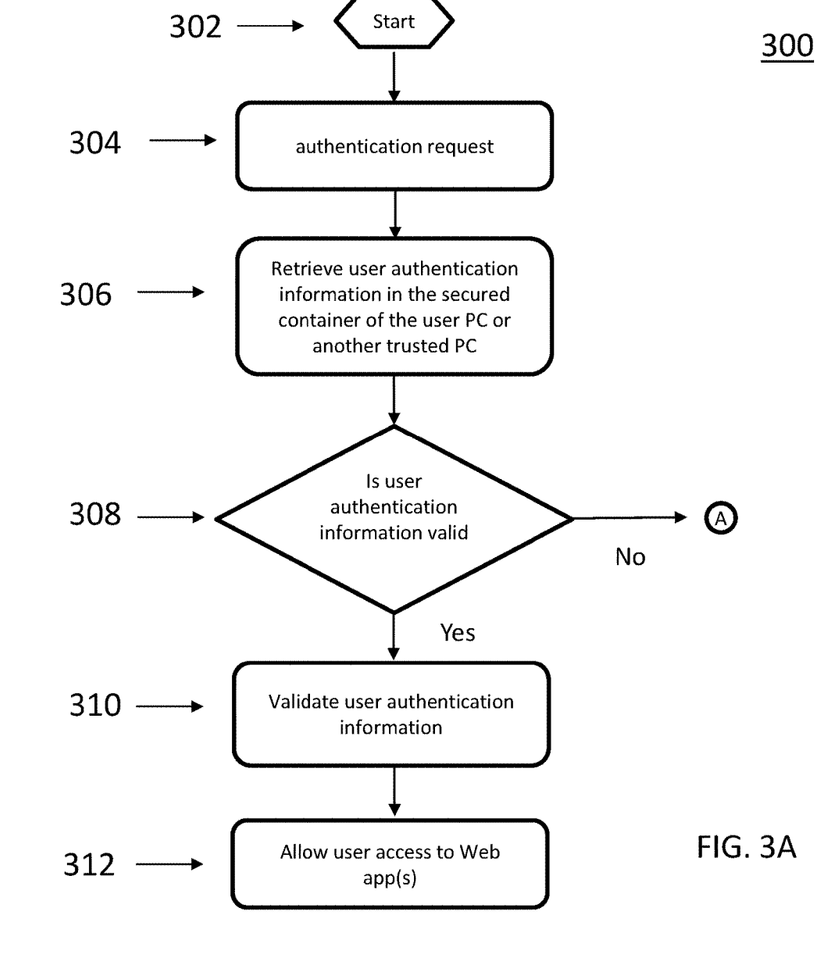
FIGS. 3A and 3B are illustrations of a flowchart for offline authentication of a user in accordance with the embodiment as shown in FIG. 2.
Figure 3B:
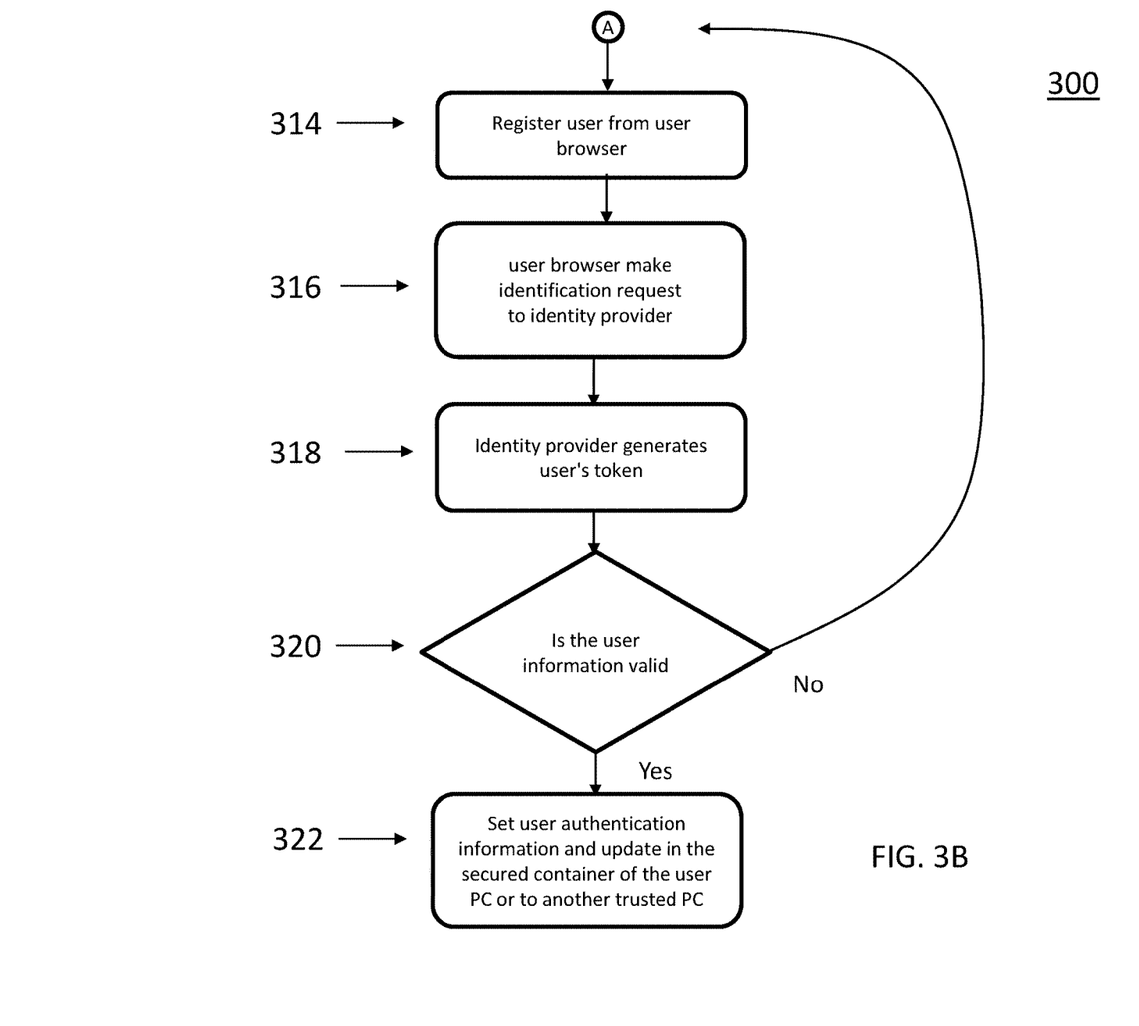

FIGS. 3A and 3B are illustrations of another flowchart 300 for offline authentication of a user 102 in accordance with the embodiment as shown in FIG. 2. As shown in FIGS. 3A and 3B, the process starts at step 302. In step 304, after the user 102 has been authenticated, for example, using a single sign-on (SSO) method on the computer system 110, 140, and the computer system 110 has received a redirection request from the one or more relying party applications 132 requested by the web browser of the computer system 110, the computer system 110 can send an authentication request to the secure container 112 in the computer system 110 of the user 102, or alternatively, from the secure container 212 in the trusted computer system 210. In step 306, the computer system 110 retrieves the user authentication information from the secure container 112 in the computer system 110 of the user 102, or alternatively, from the secure container 212 in the trusted computer system 210. In step 308, the computer system 110 determines if the user authentication information retrieved from the secure container 112 in the computer system 110 of the user 102, or alternatively, from the secure container 212 in the trusted computer system 210 is valid. For example, the user authentication information can be used to verify the identity of the user attempting to retrieve the authentication token by verifying the identity of the user (i.e., the user has to prove who they are), authentication (i.e., the user has to prove they are who they say they are); and authorization (i.e., the user has to prove they're allowed to do what they are trying to do). For example, the user authentication information can be a unique identifier, such as a user ID, along with a password, or requiring the user to provide information about physical objects or the environment or provide a biometric identifier. The determination of the validation of the authentication information retrieved from the secure container 112, 212, can also include a determination if the authentication token 160 is still valid and/or if the authentication token 160 provides the user 102 with access to the one or more relying party applications 132 hosted on the computer system 130.

In step 310, the one or more relying party applications 132 will validate the user authentication information in the authentication token received from the computer system 110. Once the user authentication information has been validated, in step 312, the one or more relying party applications 132 will allow the computer system 110 of the user 102 to access the one or more relying party applications 132 hosted on the computer system 130. In accordance with an embodiment, in step 308, if the computer system 110 determines that the user authentication information is not valid, the process continues to step 314, where the computer system 110 can register the user information from the user browser and in step 316, an authentication request from the browser of the computer system 110 is sent to the identity provider (IdP) 122. In step 318, if the user information is correct, the identity provider (IdP) 122 generates the user's token (or authentication token) 160, which is sent to the computer system 110. In step 320, the computer system determines if the user information in the user's token (or authentication token) 160 is valid. If the user information is not valid in step 320, the process returns to step 314. If the user information is valid, the process continues to step 322 in which the user authentication is set and updated in the secure container of the computer system 110 of the user 102, and/or alternatively, sent to a secure container 212 of the trusted computing system 210.

Figure 4:
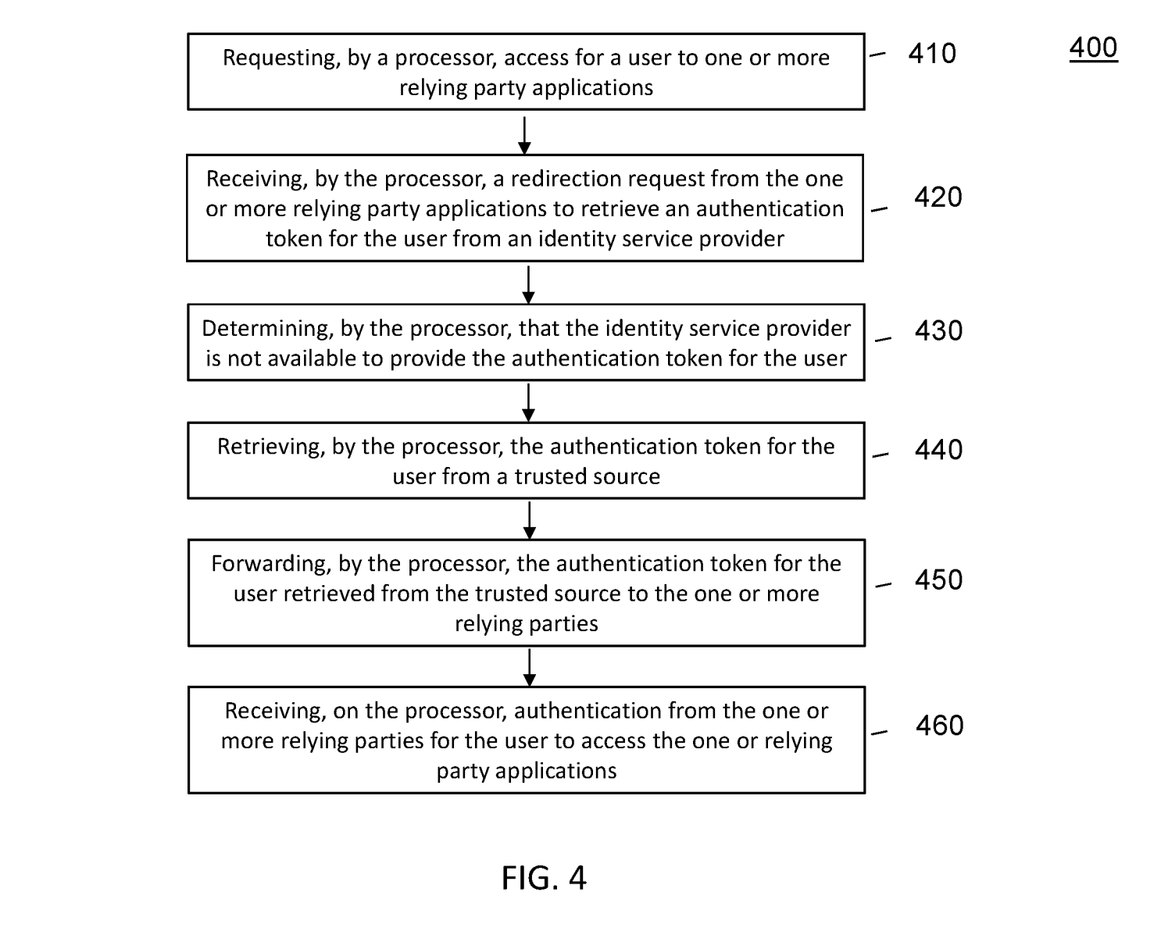
FIG. 4 is an illustration of a flowchart for offline authentication of users for access to web applications in accordance with an embodiment.

FIG. 4 is an illustration of a flowchart for a method 400 for offline authentication of users for web applications in accordance with an embodiment. As shown in FIG. 4, the method 400 includes in step 410, requesting, by a processor, access for a user 102 to one or more relying party applications 132. In step 420, the processor receives a redirection request from the one or more relying party applications 132 to retrieve an authentication token 160 for the user 102 from an identity service provider 122. In step 430, the processor determines that the identity service provider 132 is not available to provide the authentication token 160 for the user 102. In step 440, the processor retrieves the authentication token 160 for the user 102 from a trusted source 112, 212. In step 450, the processor forwards the authentication token 160 for the user 102 retrieved from the trusted source 112, 212 to the one or more relying parties 132. In step 460, the processor receives authentication from the one or more relying parties 132 for the user 102 to access the one or relying party applications 132.

In accordance with an embodiment, the method 400 can further include the processor retrieving user authentication information associated with the authentication token 160 from the trusted source 112, 212, and validating the user 102 based on the retrieved user authentication information from the trusted source associated with the authentication token. In addition, the processor can determine a validity of the retrieved user authentication information for the authentication token 160 from the trusted source 112, 212. For example, the validity of the retrieved user information can include verifying that authenticator from the user, for example, the username and password or biometric data is correct. In addition, the retrieved user information can also include one or more of a time frame in which the retrieved authentication token 160 is valid and/or one or more limitations on computer system of the user in which the retrieved authentication token 160 is valid.

In accordance with an embodiment, the method can include receiving, by the processor, instructions on a web browser on a first computer system 110 for access to the one or more relying party applications 132, and requesting, by the processor, access to the one or more relying party applications 132.

In accordance with an embodiment, the method 400 can include requesting, by the processor, the authentication token 160 for the user 102 from the identity service provider 122, and receiving the authentication token 160 for the user 102 from the identity service provider 122. The processor can then forward the authentication token 160 for the user 102 to the trusted source 112, 212. The trusted source 112, 212 can be a secure container on a second computer system 110 in which the processor runs, or a secure container on a third computer system 210. In accordance with an embodiment, the secure container on the second computer system 110 or the third computer system 210 is a trusted platform module (TPM).

In accordance with an embodiment, the method further includes requesting, by the processor, an updated authentication token for the user from the identity service provider 122, receiving, by the processor, the updated authentication token for the user 102 from the identity service provider 122, and forwarding, by the processor, the updated authentication token for the user 102 to the trusted source 112, 212.

In accordance with an embodiment, the method can include receiving, by the processor, credentials for a single sign-on authentication method from the user 102, and authenticating, by the processor, the user based on the received credentials. The method 400 can further include receiving, by the processor, at least one authenticator or biometric from the user for the single sign-on authentication method of the user to a first computer system, and granting, by the processor, access to the user to the first computer system when the at least one authenticator or biometric identifier provides a credential or matches a stored authenticator or biometric identifier for the user.

In accordance with an embodiment, the method includes receiving, by the processor, a biometric identifier from a biometric authentication device, the biometric authentication device including one or more of a sensor, a scanning device, or an electronic reader, the biometric identifier being at least one physiological characteristic of the one or more users, and wherein the at least one physiological characteristic is selected from one or more of fingerprints, palm veins, face recognition, DNA (deoxyribonucleic acid), palm print, hand geometry, iris recognition, retina, and/or odor/scent. In accordance with an embodiment, an authenticator of the one or more authenticators or biometric identifiers comprises one or more of a keypad for a username and password, a sensor, scanning device, or an electronic reader, which can read and/or obtain data from one or more of a proximity cards, a radio-frequency identification (RFID) card, smart cards, and RSA tokens.

In accordance with an embodiment, the one or more relying party applications can be cloud computing resources. For example, the cloud computing resources can be web applications hosted on one or more computer systems or servers 130.

Figure 5:
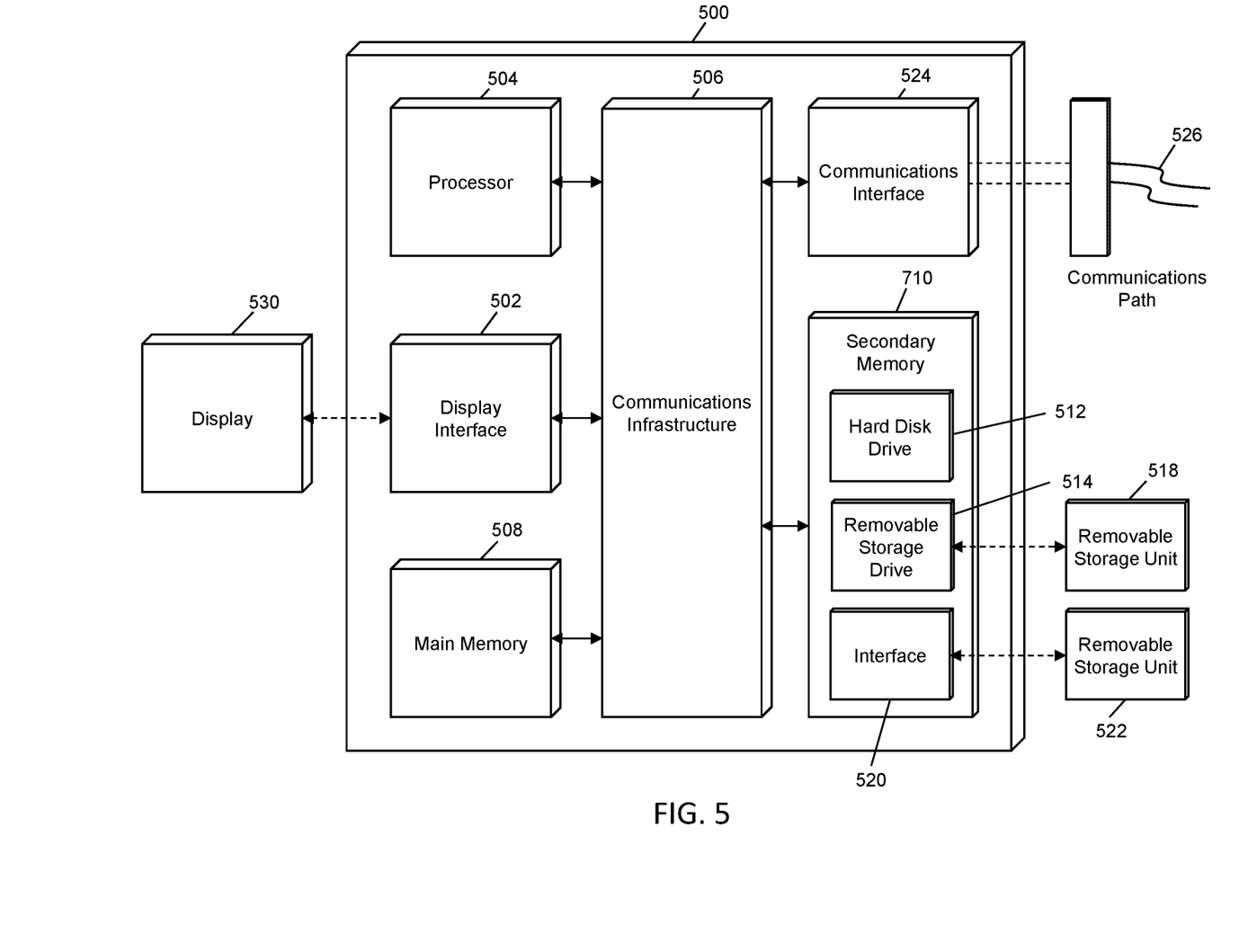
FIG. 5 is an illustration of an exemplary hardware architecture for an embodiment of a computer system.

FIG. 5 illustrates a representative computer system 500 in which embodiments of the present disclosure, or portions thereof, may be implemented as computer-readable code executed on hardware. For example, the one or more computer systems 110, 120, 130, 140, 210 associated with the method and system for offline authentication of a user as disclosed herein may be implemented in whole or in part by a computer system 500 using hardware, software executed on hardware, firmware, non-transitory computer readable media having instructions stored thereon, or a combination thereof and may be implemented in one or more computer systems or other processing systems. Hardware, software executed on hardware, or any combination thereof may embody modules and components used to implement the methods and steps of the presently described method and system.

If programmable logic is used, such logic may execute on a commercially available processing platform configured by executable software code to become a specific purpose computer or a special purpose device (for example, programmable logic array, application-specific integrated circuit, etc.). A person having ordinary skill in the art may appreciate that embodiments of the disclosed subject matter can be practiced with various computer system configurations, including multi-core multiprocessor systems, mini-computers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this representative computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

A processor device 504 may be processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network ("LAN"), a wide area network ("WAN"), a wireless network (e.g., "Wi-Fi"), a mobile communication network, a satellite network, the Internet, fiber optic, coaxial cable, infrared, radio frequency ("RF"), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc. Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 1-4, as discussed herein. Accordingly, such computer programs may represent controllers of the computer system 500. Where the present disclosure is implemented using software executed on hardware, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software executed on hardware, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, method and system for authenticating users. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for offline authentication of users for access to web applications, the method comprising:

requesting, by a processor, access for a user to one or more relying party applications;

receiving, by the processor, a redirection request from the one or more relying party applications to retrieve an authentication token for the user from an identity service provider;

determining, by the processor, that the identity service provider is not available to provide the authentication token for the user;

retrieving, by the processor, the authentication token for the user from a trusted source;

determining, by the processor, a validity of the retrieved authentication token from the trusted source, the validity of the retrieved authentication token including limitations on one or more types of computer systems in which the retrieved authentication token is valid, the limitations on the one or more types of computer systems in which the retrieved authentication token is valid include that the retrieved authentication token may not be used with a mobile device;

forwarding, by the processor, the retrieved authentication token for the user from the trusted source to the one or more relying parties when the retrieved authentication token has been determined to be valid based on the limitations on the one or more types of computer systems; and receiving, on the processor, authentication from the one or more relying parties for the user to access the one or more relying party applications.

2. The method according to claim 1, further comprising:
retrieving, by the processor, user authentication information associated with the retrieved authentication token from the trusted source; and
validating, by the processor, the user based on the retrieved user authentication information from the trusted source associated with the retrieved authentication token.

3. The method according to claim 2, wherein the validity of the retrieved user information includes a time frame in which the retrieved authentication token is valid.

4. The method according to claim 1, further comprising:
receiving, by the processor, instruction on a web browser on a first computer system for access to the one or more relying party applications; and
requesting, by the processor, access to the one or more relying party applications.

5. The method according to claim 1, further comprising:
requesting, by the processor, the authentication token for the user from the identity service provider;
receiving, by the processor, the authentication token for the user from the identity service provider; and
forwarding, by the processor, the authentication token for the user to the trusted source.

6. The method according to claim 1, wherein the trusted source is a secure container on a second computer system in which the processor runs, or a secure container on a third computer system.

7. The method according to claim 6, wherein the secure container on the second computer system or the third computer system is a trusted platform module.

8. The method according to claim 1, further comprising:
requesting, by the processor, an updated authentication token for the user from the identity service provider;
receiving, by the processor, the updated authentication token for the user from the identity service provider; and
forwarding, by the processor, the updated authentication token for the user to the trusted source.

9. The method according to claim 1, further comprising:
receiving, by the processor, credentials for a single sign-on authentication method from the computer system of the user, the computer system of the user being a client device in communication with the processor, and wherein the processor is in another computer system; and
authenticating, by the processor, the user based on the credentials received from the client device of the user.

10. The method according to claim 1, further comprising:
receiving, by the processor, at least one authenticator or biometric from the user for a single sign-on authentication method of the user to a first computer system, the processor being part of the first computer system; and
granting, by the processor, access to the user to the first computer system when the at least one authenticator or biometric identifier provides a credential or matches a stored authenticator or biometric identifier for the user in the first computer system.

11. The method according to claim 10, comprising:
receiving, by the processor, a biometric identifier from a biometric authentication device, the biometric authentication device including one or more of a sensor, a scanning device, or an electronic reader, the biometric identifier being at least one physiological characteristic of the one or more users, and wherein the at least one physiological characteristic is selected from one or more of fingerprints, palm veins, face recognition, DNA (deoxyribonucleic acid), palm print, hand geometry, iris recognition, retina, and/or odor/scent.

12. The method according to claim 10, wherein an authenticator of the one or more authenticators or biometric identifiers comprises one or more of a keypad for a username and password, a sensor, scanning device, or an electronic reader, which can read and/or obtain data from one or more of a proximity cards, a radio-frequency identification (RFID) card, smart cards, and RSA tokens.

13. The method according to claim 1, wherein the one or more relying party application are cloud computing resources and the one or more limitations on the computer system of the user is a type of computer system.

14. A computer program product for offline authentication of users for access to web applications, the computer program product comprising:
a non-transitory computer-readable storage medium having program instructions embodied therewith, the program instructions executable by a computer to cause the computer to perform a method, comprising:
requesting, by a processor, access for a user to one or more relying party applications;
receiving, by the processor, a redirection request from the one or more relying party applications to retrieve an authentication token for the user from an identity service provider;
determining, by the processor, that the identity service provider is not available to provide the authentication token for the user;
retrieving, by the processor, the authentication token for the user from a trusted source;
determining, by the processor, a validity of the retrieved authentication token from the trusted source, the validity of the retrieved authentication token including limitations on one or more types of computer systems in which the retrieved authentication token is valid, the limitations on the one or more types of computer systems in which the retrieved authentication token is valid include that the retrieved authentication token may not be used with a mobile device;
forwarding, by the processor, the retrieved authentication token for the user from the trusted source to the one or more relying parties when the retrieved authentication token has been determined to be valid based on the limitations on the one or more types of computer systems; and
receiving, on the processor, authentication from the one or more relying parties for the user to access the one or more relying party applications.

15. The computer program product according to claim 14, further comprising:
retrieving, by the processor, user authentication information associated with the retrieved authentication token from the trusted source; and
validating, by the processor, the user based on the retrieved user authentication information from the trusted source associated with the retrieved authentication token.

16. The computer program product according to claim 15, wherein the validity of the retrieved user information includes a time frame in which the retrieved authentication token is valid.

17. The computer program product according to claim 14, further comprising:
- receiving, by the processor, instruction on a web browser on a first computer system for access to the one or more relying party applications; and
- requesting, by the processor, access to the one or more relying party applications.

18. The computer program product according to claim 14, further comprising:
- requesting, by the processor, the authentication token for the user from the identity service provider;
- receiving, by the processor, the authentication token for the user from the identity service provider; and
- forwarding, by the processor, the authentication token for the user to the trusted source.

19. A system for offline authentication of users for access to web applications, the system comprising:
- a processor configured to:
  - request access for a user to one or more relying party applications;
  - receive a redirection request from the one or more relying party applications to retrieve an authentication token for the user from an identity service provider;
  - determine that the identity service provider is not available to provide the authentication token for the user;
  - retrieve the authentication token for the user from a trusted source;
  - determine a validity of the retrieved authentication token from the trusted source, the validity of the retrieved authentication token including limitations on one or more types of computer systems in which the retrieved authentication token is valid, the limitations on the one or more types of computer systems in which the retrieved authentication token is valid include that the retrieved authentication token may not be used with a mobile device;
  - forward the retrieved authentication token for the user from the trusted source to the one or more relying parties when the retrieved authentication token has been determined to be valid based on the limitations on the one or more types of computer systems; and
  - receive authentication from the one or more relying parties for the user to access the one or more relying party applications.

20. The system according to claim 19, wherein the processor is further configured to:
- retrieve user authentication information associated with the retrieved authentication token from the trusted source;
- validate the user based on the retrieved user authentication information from the trusted source associated with the retrieved authentication token; and
- wherein the validity of the retrieved user information includes a time frame in which the retrieved authentication token is valid.

* * * * *